United States Patent
Kao et al.

(10) Patent No.: US 12,515,743 B2
(45) Date of Patent: Jan. 6, 2026

(54) CAR BODY STRUCTURE AND DRIVING UNIT INCLUDING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Chen-Ting Kao, New Taipei (TW); Chih-Cheng Lee, New Taipei (TW); Chiung-Hsiang Wu, New Taipei (TW); Sheng-Li Yen, New Taipei (TW); Yu-Cheng Zhang, New Taipei (TW); Chen Chao, New Taipei (TW); Chang-Ju Hsieh, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 479 days.

(21) Appl. No.: 18/090,188

(22) Filed: Dec. 28, 2022

(65) Prior Publication Data
US 2023/0202565 A1 Jun. 29, 2023

(30) Foreign Application Priority Data
Dec. 28, 2021 (CN) .......................... 202123331395.8

(51) Int. Cl.
*B62D 21/11* (2006.01)
*B60G 7/00* (2006.01)
(Continued)

(52) U.S. Cl.
CPC .............. *B62D 21/11* (2013.01); *B60G 7/001* (2013.01); *B60K 7/00* (2013.01); *B62D 11/04* (2013.01); *B60K 2007/0061* (2013.01)

(58) Field of Classification Search
CPC ........ B62D 21/02; B62D 21/03; B62D 21/08; B62D 21/09; B62D 21/10; B62D 21/12;
(Continued)

(56) References Cited

U.S. PATENT DOCUMENTS 3,481,643 A * 12/1969 Campbell .......... B62D 25/2054
52/798.1
4,513,832 A * 4/1985 Engman .................... A61G 5/00
180/22
(Continued)

FOREIGN PATENT DOCUMENTS

DE 202016102288 U1 * 7/2017 ............. B62D 21/10
GB 1578742 A * 11/1980 ........... B62B 5/0026

OTHER PUBLICATIONS

DE202016102288, English translation (Year: 2017).*

*Primary Examiner* — Anne Marie M Boehler
(74) *Attorney, Agent, or Firm* — ScienBiziP, P.C.

(57) ABSTRACT

A car body structure includes a bottom plate, a side plate assembly, and a support rod assembly. The side plate assembly includes a first side plate and a second side plate opposite to the first side plate. The first side plate and the second plate are connected to the bottom plate and located on a same side of the bottom plate. An edge of the first side plate facing away from the bottom plate defines at least two first slots, and an edge of the second side plate facing away from the bottom plate defines at least two second slots. The support rod assembly includes at least two support rods, each support rod is snap-engaged with one first slot and one second slot. A surface of the support rod assembly facing away from the bottom plate is a bearing surface. A driving unit is also disclosed.

13 Claims, 14 Drawing Sheets

(51) Int. Cl.
*B60K 7/00* (2006.01)
*B62D 11/04* (2006.01)

(58) Field of Classification Search
CPC .... B62D 21/14; B62D 21/183; B62D 63/025; B60K 2007/077; B60K 2007/0038
USPC .................................. 180/6.5; 280/785, 795
See application file for complete search history.

(56) References Cited

U.S. PATENT DOCUMENTS

| | | | | |
|---|---|---|---|---|
| 5,209,541 | A * | 5/1993 | Janotik | B62D 27/02 |
| | | | | 29/469 |
| 6,070,898 | A * | 6/2000 | Dickie | B60G 11/225 |
| | | | | 180/907 |
| 7,040,429 | B2 * | 5/2006 | Molnar | A61G 5/063 |
| | | | | 280/220 |
| 2020/0031405 | A1 * | 1/2020 | Perlo | B62D 23/005 |

* cited by examiner

CAR BODY STRUCTURE AND DRIVING UNIT INCLUDING THE SAME

FIELD

The subject matter herein generally relates to a field of mobile robots, and in particular, to a car body structure and a drive assembly including the car body assembly.

BACKGROUND

A car body structure of a mobile robot includes a main body structure and a load bearing structure. The main body structure is configured to install a driving member, a wheel assembly, and a control assembly. The load bearing structure is connected with the main body structure and is configured to bear articles to be transported. Generally, the load bearing structure is connected with the main body structure through a number of screws, which is time-consuming to assemble.

BRIEF DESCRIPTION OF THE DRAWINGS

Implementations of the present technology will now be described, by way of embodiment, with reference to the attached figures.

DETAILED DESCRIPTION

The technical solutions in the embodiments of the present disclosure are clearly and completely described in the following with reference to the accompanying drawings in the embodiments of the present disclosure. The described embodiments are only some of the embodiments of the present disclosure, and not all of the embodiments. All other embodiments obtained by those skilled in the art based on the embodiments of the present disclosure without creative efforts are within the scope of the present disclosure.

Unless otherwise defined, all technical and scientific terms used herein have the same meaning as those understood in the art. The terminology used in the description of the present disclosure is for the purpose of describing particular embodiments and is not intended to limit the disclosure.

Figure 1:
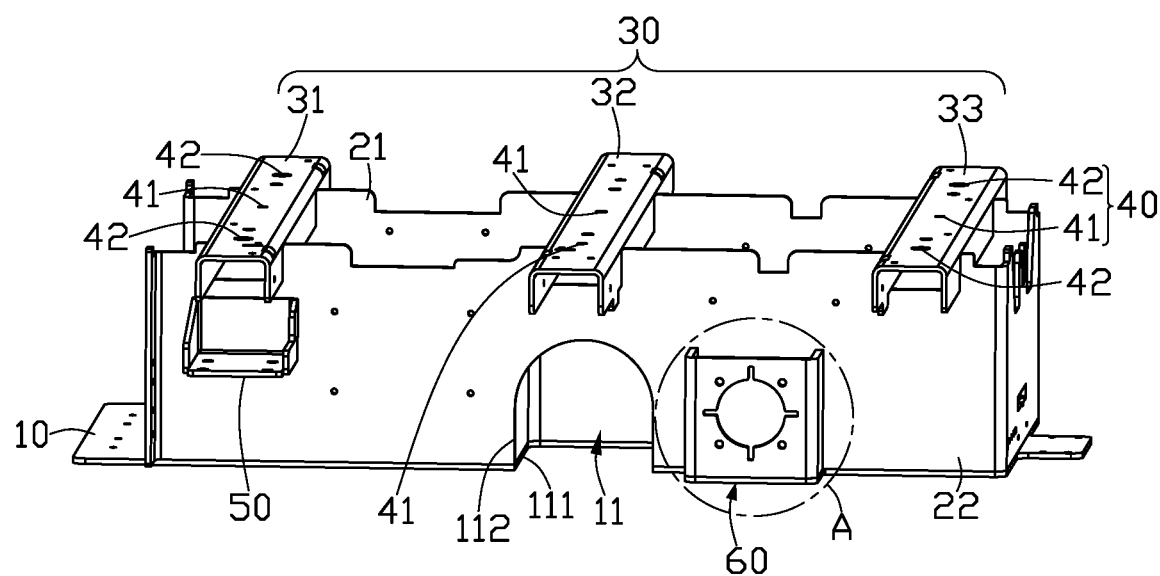
FIG. 1 is a perspective view of a car body structure according to an embodiment of the present disclosure.
Figure 2:
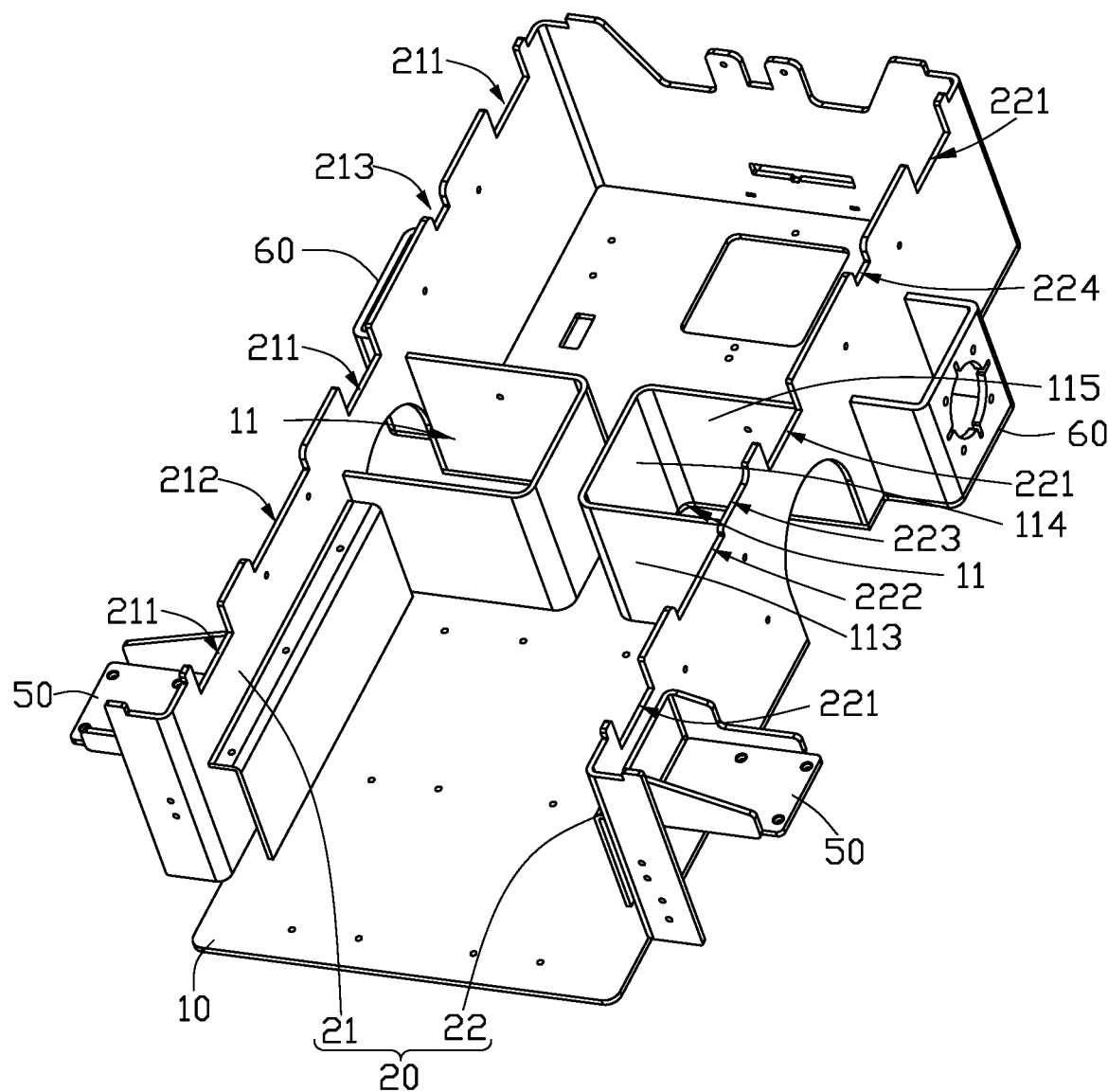
FIG. 2 is similar to FIG. 1, but viewed from another angle.

Referring to FIG. 1 and FIG. 2, a car body structure 100 of an embodiment is illustrated. The car body structure 100 includes a bottom plate 10 and a side plate assembly 20. The side plate assembly 20 includes a first side plate 21 and a second side plate 22. The first side plate 21 and the second side plate 22 are spaced apart and disposed opposite to each other. The bottom plate 10 is connected between the first side plate 21 and the second side plate 22. The bottom plate 10 is connected with two edges of the first side plate 21 and the second side plate 22, and the first side plate 21 and the second side plate 22 are located on a same side of the bottom plate 10. The other edge of the first side plate 21 facing away from the bottom plate 10 defines at least two first slots 211. The other edge of the second side plate 22 facing away from the bottom plate 10 defines at least two second slots 221. The car body structure 100 further includes a support rod assembly 30 which includes at least two support rods. Each support rod is snap-engaged with one first slot 211 and one second slot 221. An end face of the support rod assembly 30 facing away from the bottom plate 10 functions as a bearing surface (not shown).

The support rod assembly 30 is snap-engaged with the first slots 211 and the second slots 221, so that a bearing structure of the car body structure 100 can be assembled quickly, and an assembly efficiency of the car body structure 100 is improved.

In some embodiments, after the support rod assembly 30 is snap-engaged with the first slots 211 and the second slots 221, the support rod assembly 30 is fixed into the first slots 211 and the second slots 221 by welding. In this way, the load borne by the car body structure 100 can be increased.

In some embodiments, referring to FIG. 1 and FIG. 2, the first side plate 21 further defines a third slot 212 and a fourth slot 213, and the second side plate 22 further defines a fifth slot 22, a sixth slot 223, and a seventh slot 224.

In some embodiments, the support rod assembly 30 includes at least three support rods, and different support rods are arranged at equal intervals. In this way, a bearing strength can be improved.

Specifically, referring to FIG. 1, the support rod assembly 30 includes a first support rod 31, a second support rod 32, and a third support rod 33. One end of each of the first support rod 31, the second support rod 32, and the third support rod 33 is snap-engaged with one first slot 211, and the other end of each of the first support rod 31, the second support rod 32, and the third support rod 33 is snap-engaged with one second slot 221. The first support rod 31, the second support rod 32, and the third support rod 33 are arranged at equal intervals. In other embodiments, the first support rod 31, the second support rod 32, and the third support rod 33 are arranged at unequal intervals.

Figure 3:
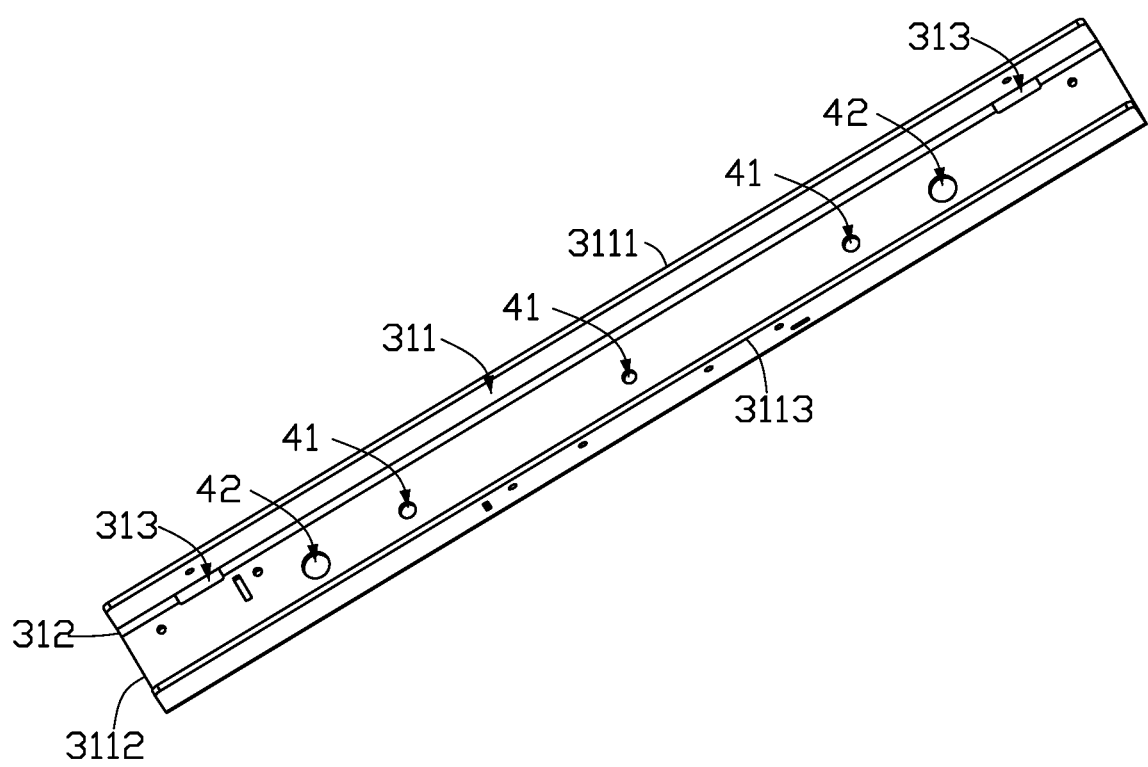
FIG. 3 is a perspective view of a first support rod of the car body structure of FIG. 1.
Figure 4:
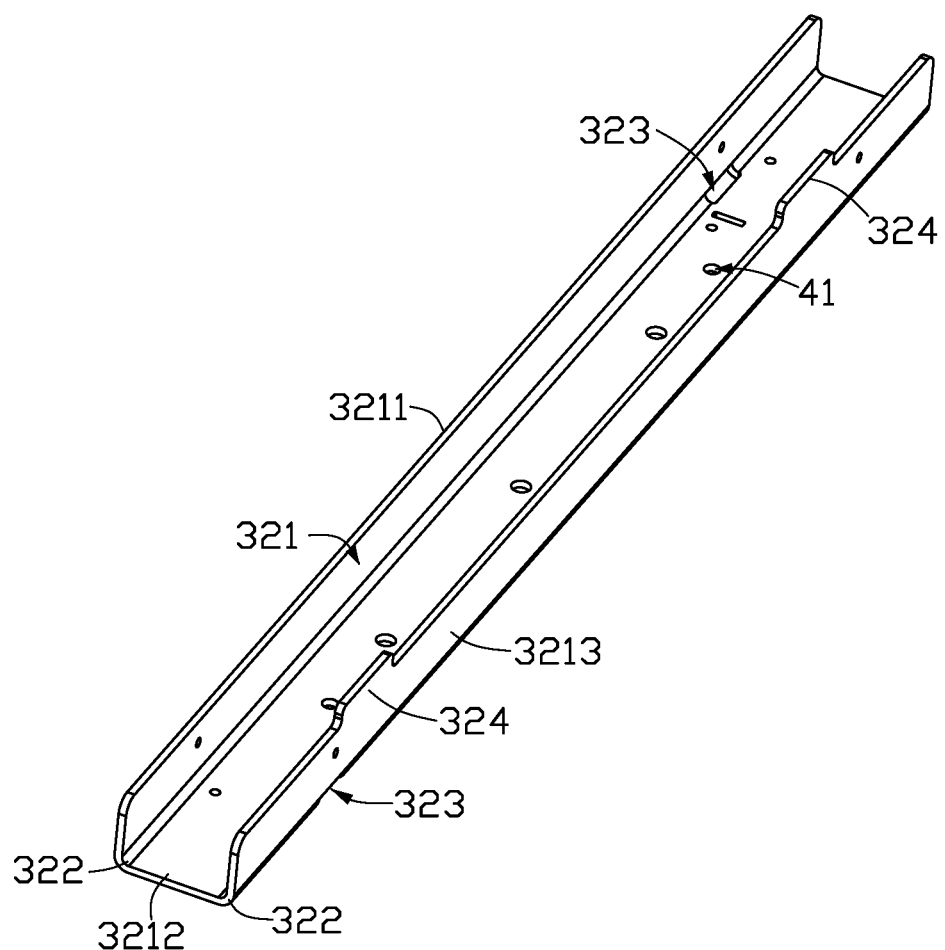
FIG. 4 is a perspective view of a second support rod of the car body structure of FIG. 1.
Figure 5:
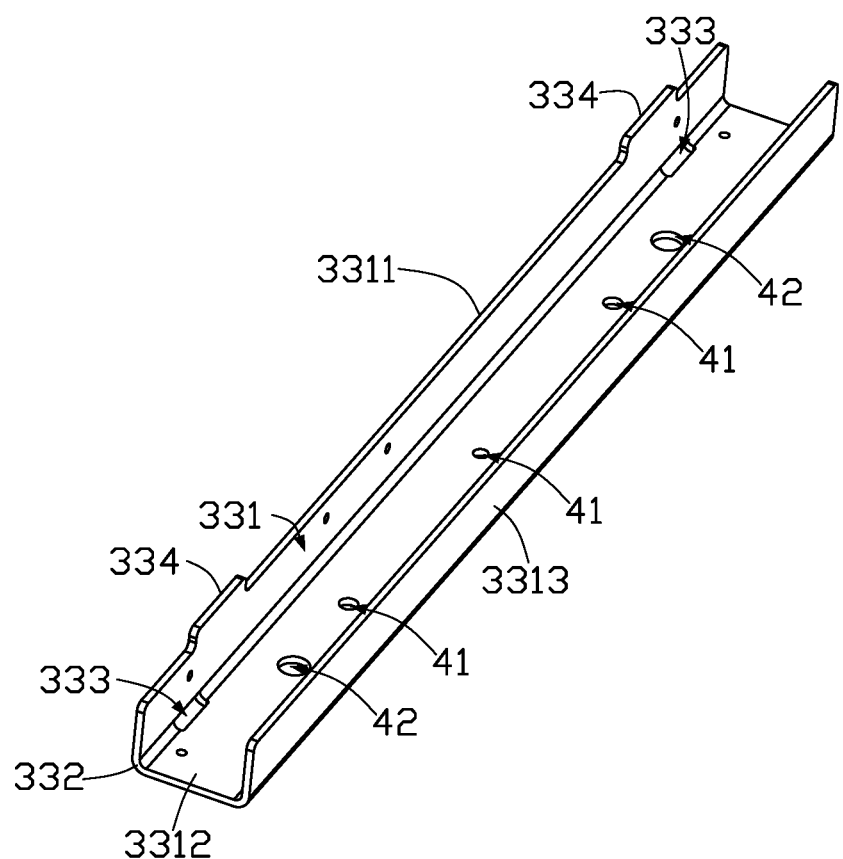
FIG. 5 is a perspective view of a third support rod of the car body structure of FIG. 1.

Referring to FIGS. 3 to 5, each support rod includes a bottom wall, a first side wall, and a second side wall. The first side wall and the second side wall are disposed opposite to each other. The bottom wall is connected between the first side wall and the second side wall. The first side wall, the bottom wall, and the second side wall enclose a groove facing toward the bottom plate 10. A surface of the bottom wall facing away from the bottom plate 10 functions as the bearing surface.

Specifically, the first support rod 31 includes a bottom wall 3112, a first side wall 3111, and a second side wall 3113. The first side wall 3111 and the second side wall 3113 are disposed opposite to each other. The bottom wall 3112 is connected between the first side wall 3111 and the second side wall 3113. The first side wall 3111, the bottom wall 3112, and the second side wall 31113 enclose a groove 311 facing toward the bottom plate 10. A surface of the bottom wall 3112 facing away from the bottom plate 10 functions as the bearing surface. In some embodiments, an arc-shaped connecting portion 312 is disposed at the connection between the second side wall 3113 and the bottom wall 3112. The connecting portion 312 is provided with two first through holes 313 which are arranged at intervals.

Specifically, the second support rod 32 includes a bottom wall 3212, a first side wall 3211, and a second side wall 3213. The first side wall 3211 and the second side wall 3213 are disposed opposite to each other. The bottom wall 3212 is connected between the first side wall 3211 and the second side wall 3213. The first side wall 3211, the bottom wall 3212, and the second side wall 32113 enclose a groove 321 facing toward the bottom plate 10. A surface of the bottom wall 3212 facing away from the bottom plate 10 functions as the bearing surface. In some embodiments, one arc-shaped connecting portion 322 is disposed at the connection between the first side wall 3211 and the bottom wall 3212, and another arc-shaped connecting portion 322 is disposed at the connection between the second side wall 3213 and the bottom wall 3212. Each of the two connecting portions 322 is provided with one second through hole 323, and the two second through holes 323 of the two connecting portions 322 are located in misalignment. An end face of the second side wall 3213 facing away from the bottom wall 3212 is provided with two first bosses 324 which are arranged at intervals. When the second support rod 32 is snap-engaged with the first side plate 21 and the second side plate 22, two first bosses 324 are outside the first side plate 21 and the second side plate 22, respectively.

Specifically, the third support rod 33 includes a bottom wall 3312, a first side wall 3311, and a second side wall 3313. The first side wall 3311 and the second side wall 3313 are disposed opposite to each other. The bottom wall 3312 is connected between the first side wall 3311 and the second side wall 3313. The first side wall 3311, the bottom wall 3312, and the second side wall 33113 enclose a groove 331 facing toward the bottom plate 10. A surface of the bottom wall 3312 facing away from the bottom plate 10 functions as the bearing surface. In some embodiments, one arc-shaped connecting portion 332 is disposed at the connection between the first side wall 3311 and the bottom wall 3312, and another arc-shaped connecting portion is disposed at the connection between the second side wall 3313 and the bottom wall 3312. The connecting portion 332 defines two third through hole 333 which are arranged at intervals. An end face of the first side wall 3311 facing away from the bottom wall 3312 is provided with two second bosses 334 which are arranged at intervals. When the third support rod 33 is snap-engaged with the first side plate 21 and the second side plate 22, two second bosses 334 are outside the first side plate 21 and the second side plate 22, respectively.

In other embodiments, the first through holes 313, the connecting portions 312, 322 and 332, the second through holes 323, the first bosses 324, the third through holes 333, and the second bosses 334 can be omitted.

Referring to FIG. 1, a mounting portion 40 is disposed on the bearing surface of the support rod assembly 30. The mounting portion 40 is configured to mount to a housing (not shown) of a driving unit (not shown) and/or an article to be transported (not shown). The mounting portion 40 includes a first mounting portion 41 and a second mounting portion 42. The first mounting portion 41 is configured to mount to the article to be transported, and the second mounting portion 42 is configured to mount to the housing.

Referring to FIG. 1, the first mounting portion 41 and the second mounting portion 42 are through holes, and the support rod assembly 30 is coupled to the article to be transported and the housing through screws.

In some embodiments, the first mounting portion 41 and the second mounting portion 42 are through holes, and nuts are welded onto hole walls of the through holes. The nuts are configured to threadedly connect to the housing or the article to be transported.

In other embodiments, connection means between the support rod assembly 30 and the housing or the article to be transported may include magnetic attraction and clamping. Accordingly, the mounting portion 40 may be a magnet, magnetic attraction member, a convex structure, or a groove.

The car body structure 100 is a sheet metal part, which is manufactured by a sheet metal process. The sheet metal process is an existing technology, so it will not be detailed here.

Provision of the first through holes 313, the connecting portions 312, 322, and 332, the second through holes 323, the first bosses 324, the third through holes 333, and the second bosses 334 can avoid stress cracking of the first support rod 31, the second support rod 32, and the third support rod, thereby improving strength of the support rod.

Figure 8:
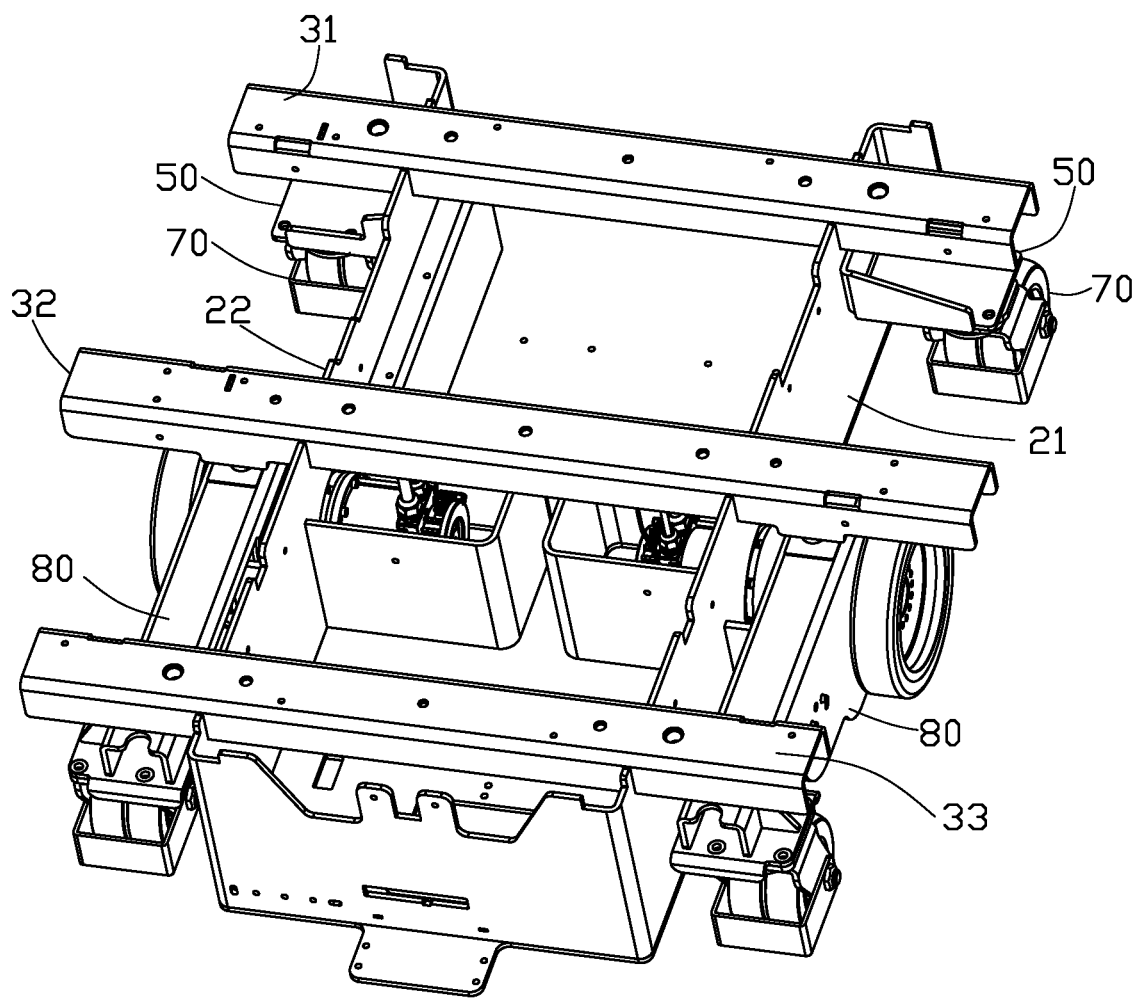
FIG. 8 is a perspective view of a local structure of a driving unit according to an embodiment of the present disclosure.

Referring to FIG. 8, a driving unit 200 of an embodiment is illustrated. The driving unit 200 includes the car body structure 100.

Figure 6:
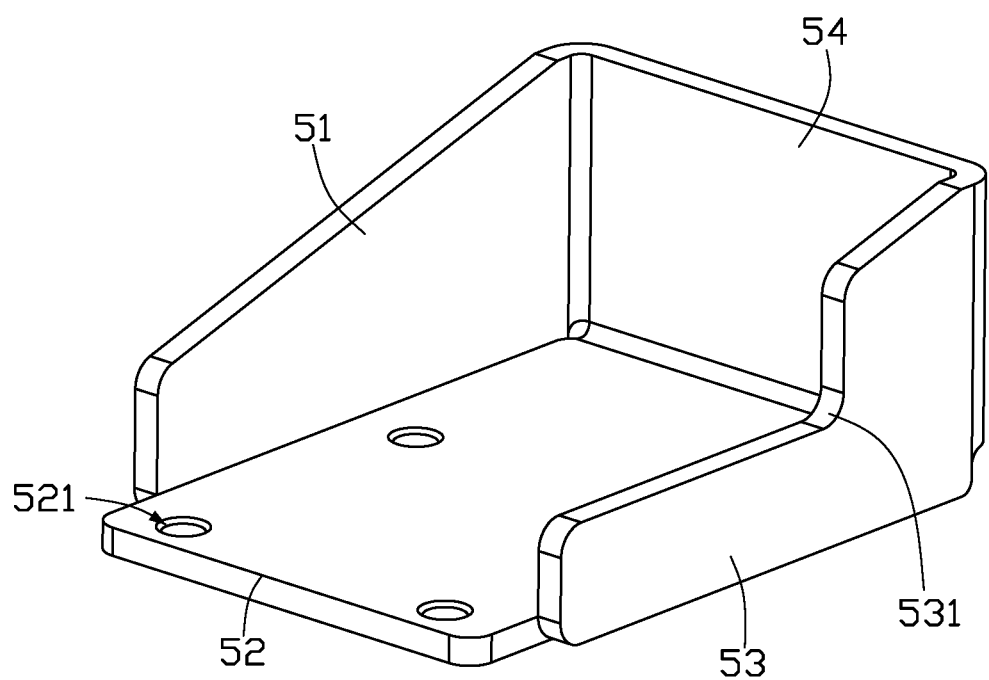
FIG. 6 is a first mounting member of the car body structure of FIG. 1.

Referring to FIG. 8, the car body structure 100 further includes a first mounting member 50. Referring to FIG. 6, the first mounting member 50 includes a first mounting plate 51, a second mounting plate 52, and a third mounting plate 53. The first mounting plate 51 and the third mounting plate 53 are spaced apart and disposed opposite to each other, and the second mounting plate 52 connects to the first mounting plate 51 and the second mounting plate 52. A step portion 531 is disposed on an end of the third mounting plate 53 facing away from the second mounting plate 52. The driving unit 200 further includes a first steering wheel assembly 70. The first steering wheel assembly 70 is connected with the second mounting plate 52, and the first steering wheel assembly 70 is on a side of the second mounting plate 52 facing away from the first mounting plate 51.

In some embodiments, the car body structure 100 includes two first mounting members 50. The two first mounting members 50 are connected with the first side plate 21 and the second side plate 22, respectively. The two first mounting members 50 are symmetrically disposed. Accordingly, the driving unit 200 includes two first steering wheel assemblies 70. In other embodiments, the number of the first mounting members 50 is set according to actual needs. The first mounting members 50 on two sides of the first side plate 21 and the second side plate 22 can be asymmetrically disposed.

Specifically, the first mounting member 50 further includes a fourth mounting plate 54, and three adjacent sides of the fourth mounting plate 54 are respectively connected with the first mounting plate 51, the second mounting plate 52, and the third mounting plate 53. The fourth mounting plate 54 is connected with a corresponding side plate. Specifically, the fourth mounting plate 54 of one first mounting member 50 is connected with the first side plate 21, and the fourth mounting plate 54 of another second mounting member 50 is connected with the second side plate 22. In some embodiments, the first mounting plate 51 is a trapezoidal plate.

In other embodiments, the first mounting plate 51 may be of other shapes, and the first mounting member 50 may be connected with the bottom plate 10. The second mounting plate 52 is provided with a first mounting through hole 521, and the first steering wheel assembly 70 is connected with the second mounting plate 52 through a screw and the first mounting through hole 521. In other embodiments, the connection mean between the first steering wheel assembly 70 and the second mounting plate 52 can be hinging, clamping, etc.

Figure 9:
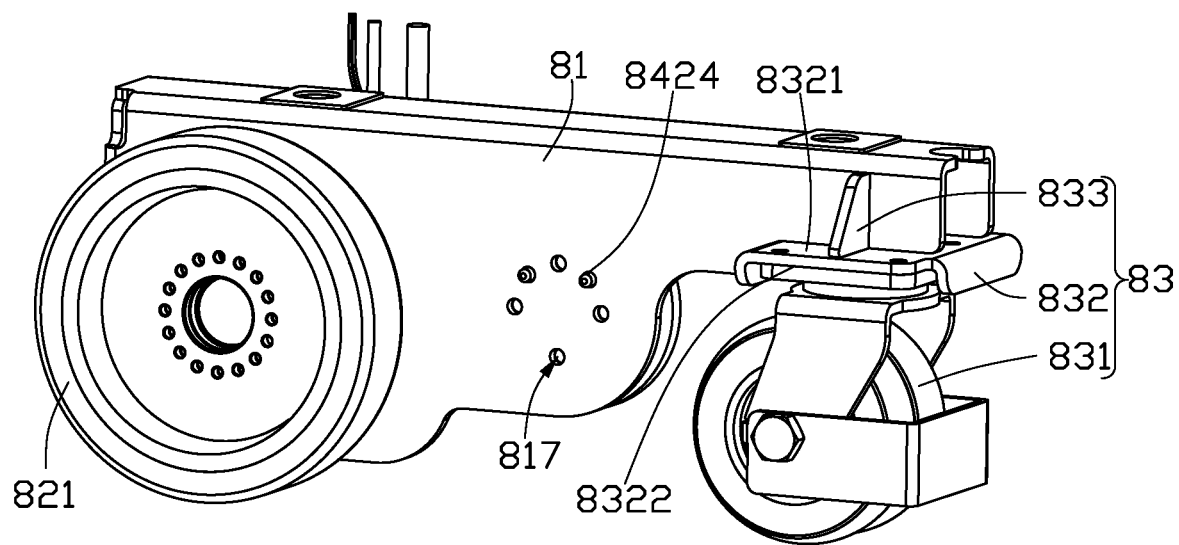
FIG. 9 is a swing arm assembly of the driving unit of FIG. 8.
Figure 10:
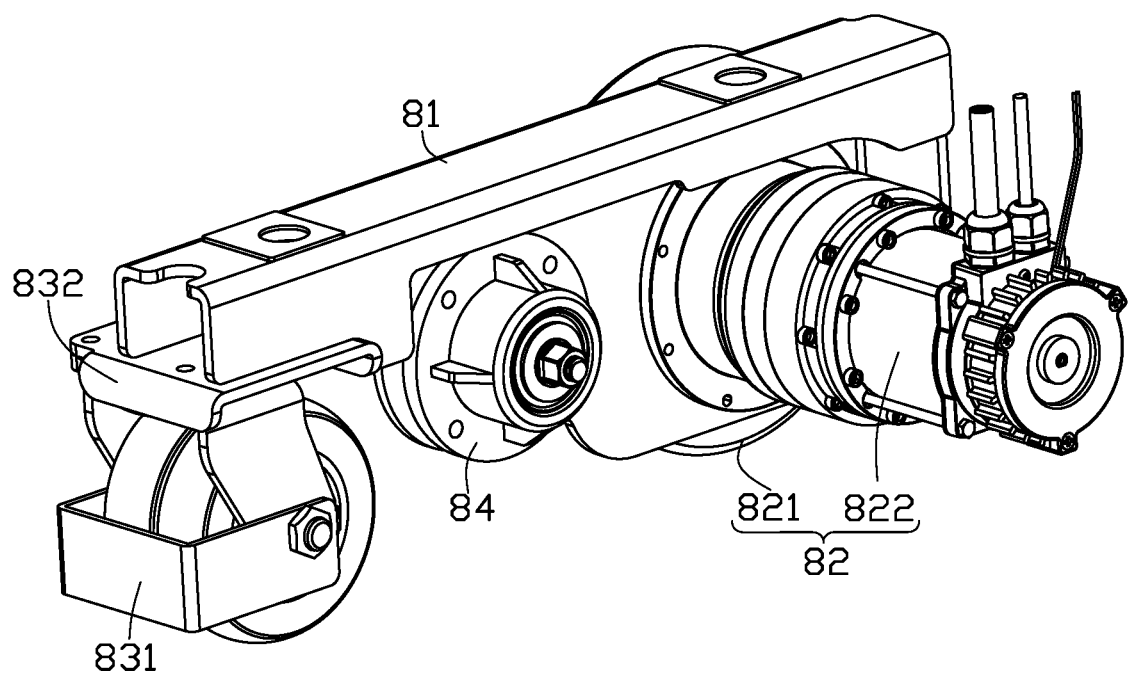
FIG. 10 is similar to FIG. 9, but viewed from another angle.

Referring to FIGS. 8 to 10, the driving unit 200 further includes a swing arm assembly 80. The swing arm assembly 80 includes an arm body 81, a directional wheel assembly 82, and a second steering wheel assembly 83. The directional wheel assembly 82 and the second steering wheel assembly 83 are connected to the arm body 81. The directional wheel assembly 82 includes a directional wheel 821 and a driving member 822. The driving member 822 is connected with the directional wheel 821 and is configured to drive the directional wheel 821 to rotate. The swing arm assembly 80 further includes a rotating shaft assembly 84. The rotating shaft assembly 84 is disposed between the directional wheel assembly 82 and the second steering wheel assembly 83. The directional wheel assembly 82 and the second steering wheel assembly 83 rotate in the same direction around the rotating shaft assembly 84. That is, the directional wheel assembly 82 and the second steering wheel assembly 83 rotate clockwise or counterclockwise around the rotating shaft assembly 84. Provision of the swing arm assembly 80 enables the driving unit 200 to adapt to different terrain changes, thereby improving the stability of the driving unit 200.

In one embodiment, the number of the swing arm assemblies 80 is two, one is connected with the first side plate 21, and the other is connected with the second side plate 22. The second steering wheel assembly 83 is arranged far away from the first steering wheel assembly 70.

In other embodiments, the number of the swing arm assemblies 80 can be set according to actual needs. The second steering wheel assembly 83 can be arranged close to the first steering wheel assembly 70.

Figure 11:
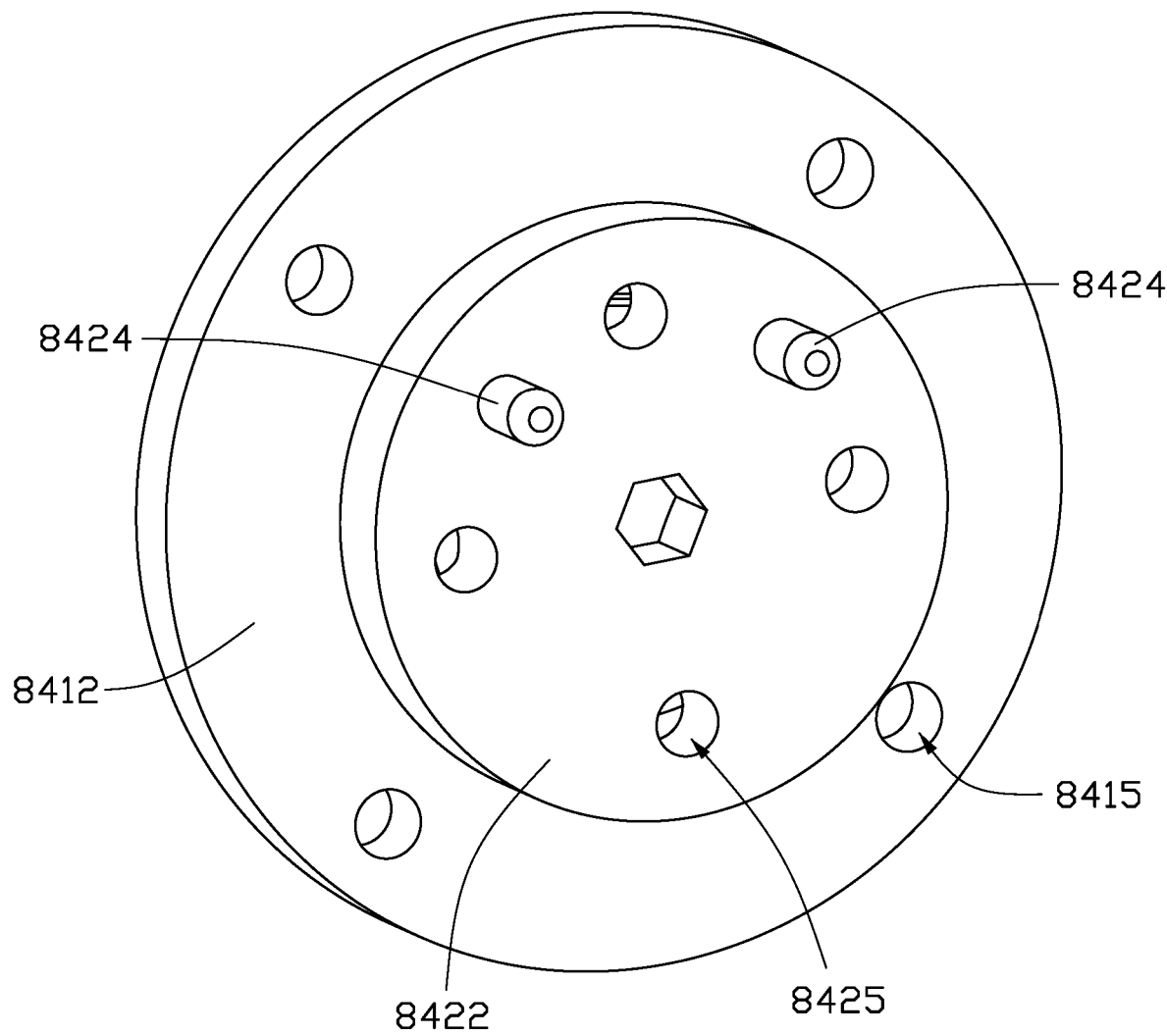
FIG. 11 is a rotating shaft assembly of the swing arm assembly of FIG. 10.
Figure 12:
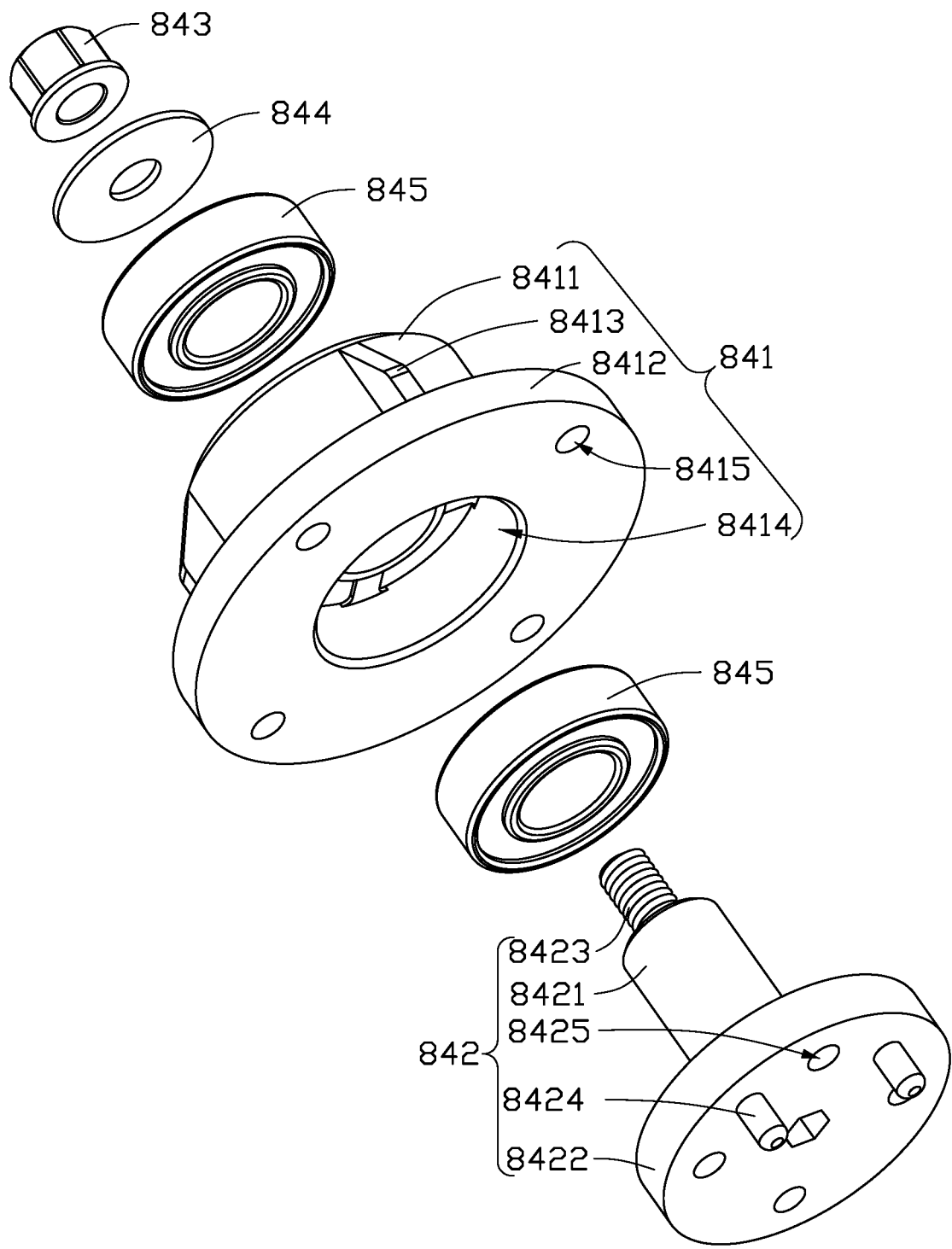
FIG. 12 is an exploded view of the rotating shaft assembly of FIG. 11.
Figure 13:
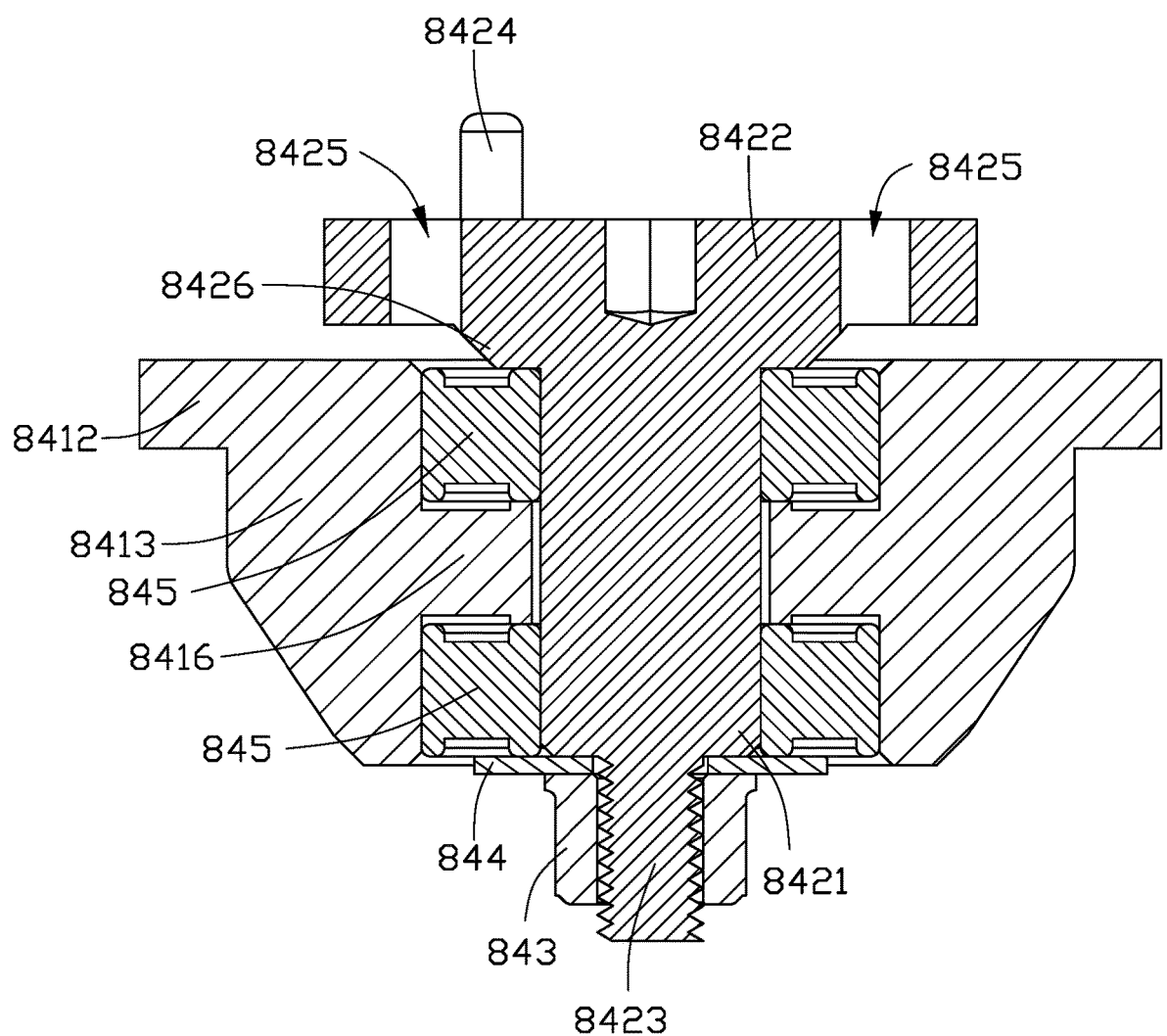
FIG. 13 is a cross-sectional view of the rotating shaft assembly of FIG. 11.

Referring to FIGS. 11 to 13, the rotating shaft assembly 84 includes a mounting base 841, a rotating shaft 842, a fastening member 843, a gasket 844, and a buffer 845. The mounting base 841 includes a first mounting portion 8411 and a second mounting portion 8412 connected to each other. A size of the second mounting portion 8412 is larger than a size of the first mounting portion 8411. The mounting base 841 further includes a first reinforcing rib 8413. Two adjacent sides of the first reinforcing rib 8413 are respectively connected with the first mounting portion 8411 and the second mounting portion 8412, improving a strength of the mounting base 841. The mounting base 841 further defines a second mounting through hole 8414. A first limiting portion 8416 is disposed on a wall defining the second mounting through hole 8414. Opposite sides of the first limiting portion 8416 are provided with a buffer member 845, respectively. The rotating shaft 842 extends through the buffer member 845. An outer wall and inner wall of the buffer member 845 abut against an inner wall of the mounting base 841 and an outer wall of the rotating shaft 842, respectively.

The rotating shaft 842 includes a first shaft portion 8421 and a second shaft portion 8422 connected to the first shaft portion 8421, and an end face of the first shaft portion 8421 facing away from the second shaft portion 8422 is connected with a fastening portion 8423. A size of an end of the second shaft portion 8422 near the first shaft portion 8421 is larger than a size of the first shaft portion 8421, thereby forming a second limiting portion 8426. The second limiting portion 8426 abuts against an end of one buffer member 845. The fastening portion 8423 extends beyond an end of the other buffer member 845 facing away from the first limiting portion 8416 and is connected with the gasket 844 in coordination with the fastening member 843. The buffer member 845 is limited by the second limiting portion 8426, the first limiting portion 8416, the fastening portion 8423, the gasket 844, and the fastening member 843.

The second mounting portion 8412 defines a third mounting through hole 8415, through which the connection between the mounting base 841 and the car body structure 100 is realized. The second shaft portion 8422 defines a fourth mounting through hole 8425, through which the connection between the rotating shaft 842 and the arm body 81 is realized. The rotating shaft assembly 84 is connected with the car body structure 100 and the arm body 81 through the third mounting through hole 8415 and the fourth mounting through hole 8425, so that the swing arm assembly 80 is connected with the car body structure 100. In addition, in order to facilitate the connection between the rotating shaft 842 and the arm body 81, a convex post 8424 protrudes from an end face of the second shaft portion 8422 facing away from the first shaft portion 8421. The arm body 81 defines a concave portion 818, and the convex post 8424 is matched and connected with the concave portion 818.

In other embodiments, the rotating shaft assembly 84 can be of other structures, as long as the directional wheel assembly 82 and the second steering wheel assembly 83 rotate in the same direction around the rotating shaft assembly 84. The first steering wheel assembly 70 and the second steering wheel assembly 83 can rotate independently.

Figure 14:
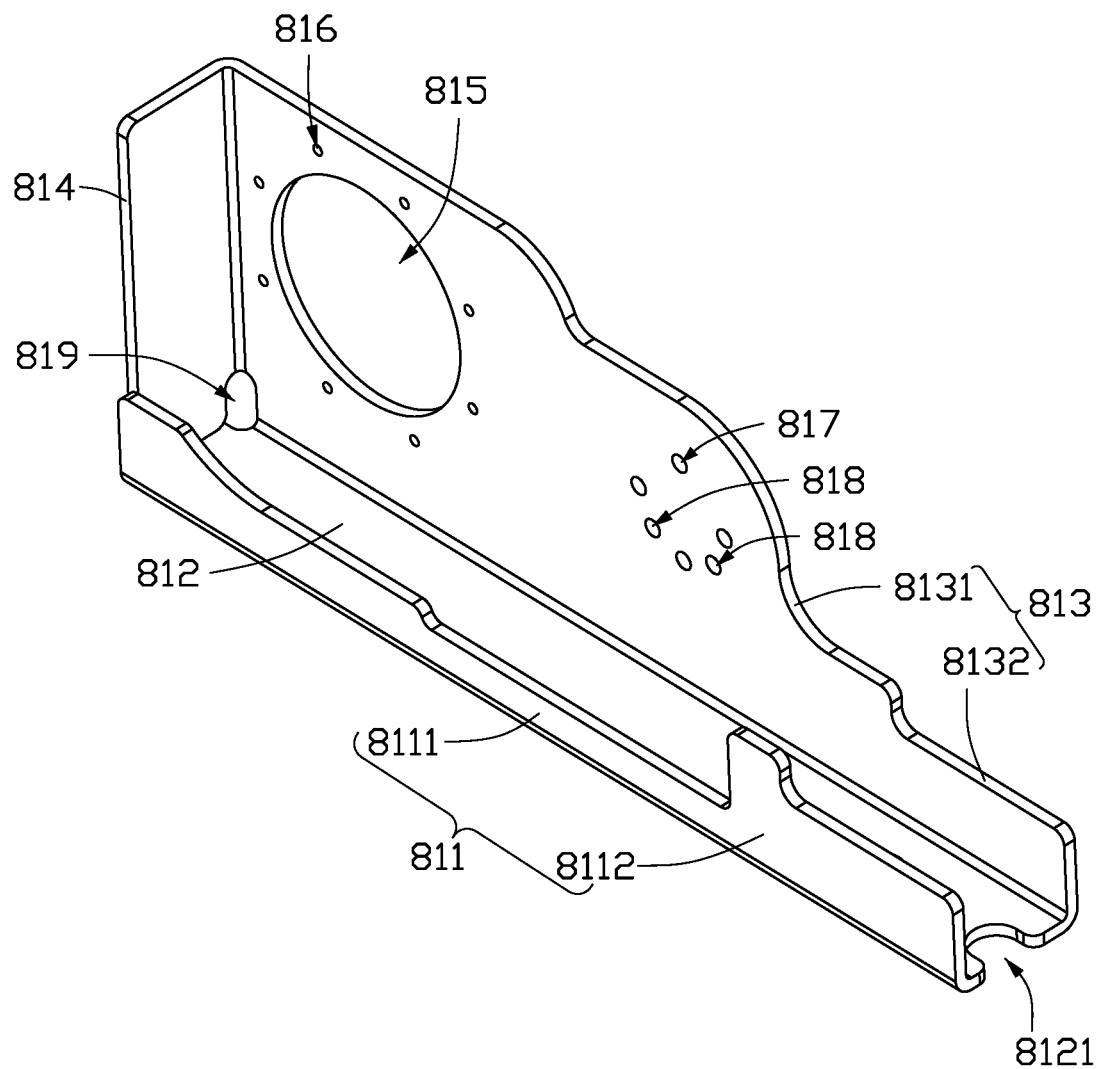
FIG. 14 is a perspective view of an arm body of the swing arm assembly of FIG. 9.

Referring to FIG. 14, the arm body 81 includes a first arm plate 811, a second arm plate 812, and a third arm plate 813 which are connected in turn. The first arm plate 811 and the third arm plate 813 are spaced apart and disposed opposite to each other. The arm body 81 further includes a fourth arm plate 814. Three adjacent sides of the fourth arm plate 814 are respectively connected with the first arm plate 811, the second arm plate 812, and the third arm plate 813. The first arm plate 811 includes a first plate portion 8111 and a second plate portion 8112 connected to the first plate portion 8111. The third arm plate 813 includes a third plate portion 8131 and a fourth plate portion 8132 connected to the third plate portion 8131. A height of the third plate portion 8131 relative to the second arm plate 812 is higher than a height of the first plate portion 8111 relative to the second arm plate 812. The second plate portion 8112 is flush with the fourth plate portion 8132. The second plate portion 8112 and the fourth plate portion 8132 are configured to connect the second steering wheel assembly 83. In addition, the third plate portion 8131 defines a fifth mounting through hole 815, which is configured for clamping the driving member 822. A plurality of sixth mounting through holes 816 are spaced around the fifth mounting through hole 815. The sixth mounting through holes 816 are configured to fix the driving member 822. The third plate portion 8131 further defines a seventh mounting through hole 817, the seventh mounting through hole 817 cooperates with the fourth mounting through hole 8425 to realize the connection between the rotating shaft 842 and the arm body 81. The third plate portion 8131 further defines the concave portion 818. In one embodiment, the concave portion 818 is a through hole.

In some embodiments, the arm body 81 is a sheet metal part. The second arm plate 812 defines a fourth through hole 8121. The arm body 81 defines a fifth through hole 819. The fifth through hole 819 is coupled to the second arm plate 812, the third arm plate 813, and the fourth arm plate 814. Provision of the fourth through hole 8121 and the fifth through hole 819 enhances the strength of the arm body 81.

In other embodiment, the arm body 81 can be of other structures, as long as the arm body 81 realizes the connection between the directional wheel assembly 82, the rotating shaft assembly 84, and the second steering wheel assembly 83.

Referring to FIG. 9 and FIG. 10, the second steering wheel assembly 83 includes a steering wheel 831, a connecting member 832, and a second reinforcing rib 833. The connecting member 832 includes a first connecting end 8321 and a second connecting end 8322 opposite to the first connecting end 8321. The second connecting end 8322 is coupled to the steering wheel piece 831. Two adjacent sides of the second reinforcing rib 833 are coupled to the arm body 81 and the first connecting end 8321, respectively. Provision of the second reinforcing rib 833 improves the bearing strength of the second steering wheel assembly 83. In other embodiments, the second reinforcing rib 833 may be omitted.

Figure 7:
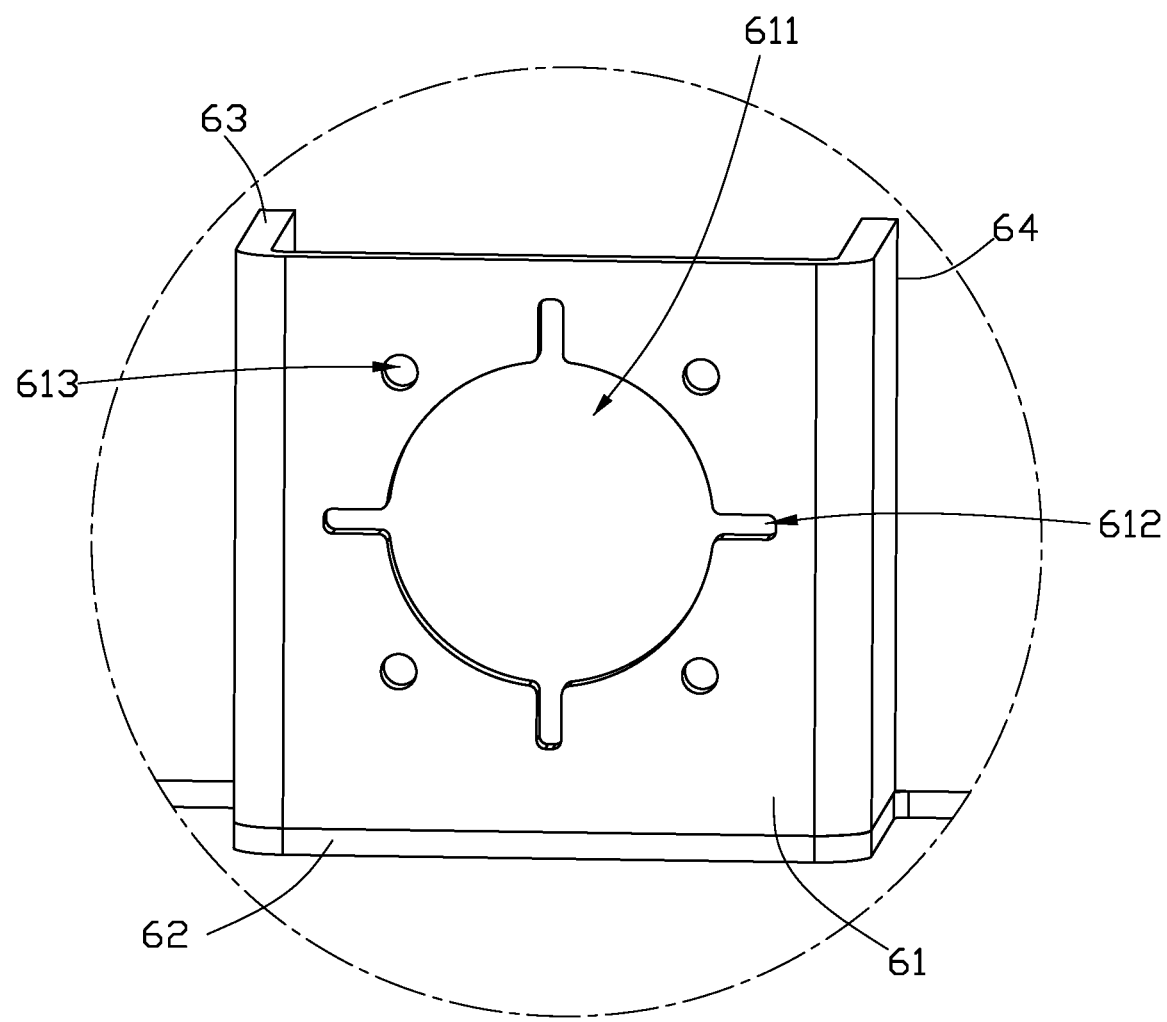
FIG. 7 is an enlarged view of circle A of FIG. 1.

Referring to FIGS. 1, 2, and 7, the car body structure 100 further includes a second mounting member 60. The second mounting member 60 is coupled to at least one of the first side plate 21 and the second side plate 22. In one embodiment, the number of the second mounting members 60 is two, one of the second mounting members 60 is coupled to the first side plate 21, and the other of the second mounting members 60 is coupled to the second side plate 22. In other embodiments, the number of the second mounting members 60 is set according to the number of the swing arm assemblies 80.

Referring to FIG. 7, the second mounting member 60 includes a first connecting plate 61, which is spaced apart from corresponding side plates. The first connecting plate 61 defines a mounting hole 611, which is configured for clamping the rotating shaft assembly 84. The wall defining the mounting hole 611 extends outwards to form a notch 612. In some embodiments, an inner wall of the notch 612 is a smooth arc structure. In one embodiment, there are four notches 612 which are evenly spaced. In other embodiments, there may be any number of notches 612, and the notches 612 can be unevenly spaced.

In other embodiments, referring to FIG. 7, the second mounting member 60 further includes a second connecting plate 62, a third connecting plate 63, and a fourth connecting plate 64. The third connecting plate 63, the first connecting plate 61, and the fourth connecting plate 64 are sequentially connected, and the third connecting plate 63 and the fourth connecting plate 64 are spaced apart and disposed opposite to each other. Two adjacent edges of the second connecting plate 62 are respectively connected with the corresponding side plate and the third connecting plate 63, and the other two adjacent edges of the second connecting plate 62 are respectively connected with the first connecting plate 61 and the fourth connecting plate 64. The first connecting plate 61 further defines an eighth through hole 613. The eighth through hole 613 is matched and connected with the third through hole 8415 to realize the connection between the mounting base 841 and the second mounting member 60.

Referring to FIGS. 1 and 2, the car body structure 100 further includes a third mounting member 11, which is configured to install the driving member 822. The third mounting member 11 includes a first recess 111 and a second recess 112. The first recess 111 is placed on the bottom plate 10, and the second recess 112 is placed on the first side plate 21 or the second side plate 22. An opening of the first recess 111 is in communication with an opening of the second recess 112. Provision of the first recess 111 and the second recess 112 reduces a longitudinal volume of the driving unit 200.

In one embodiment, the number of third mounting members 11 is two. In other embodiments, the number of third mounting member 11 is set according to the number of driving member 822.

In other embodiments, referring to FIG. 2, the third mounting member 11 further includes a first limiting plate 113, a second limiting plate 114, and a third limiting plate 115. The first limiting plate 113, the second limiting plate 114, and the third limiting plate 115 are connected in turn, and the first limiting plate 113 and the third limiting plate 115 are spaced apart and disposed opposite to each other. The first limiting plate 113 and the third limiting plate 115 are placed on the same side of the second limiting plate 114. The first limiting plate 113, the second limiting plate 114, and the third limiting plate 115 are connected with the first recess 111. The first limiting plate 113, the second limiting plate 114, and the third limiting plate 115 are placed in a space surrounded by the bottom plate 10, the first side plate 21, and the second side plate 22.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A car body structure comprising:
    a bottom plate;
    a side plate assembly comprising a first side plate and a second side plate opposite to the first side plate, the first side plate and the second plate connected to the bottom plate and located on a same side of the bottom plate, an edge of the first side plate facing away from the bottom plate defining at least two first slots, an edge of the second side plate facing away from the bottom plate defining at least two second slots;
    a support rod assembly comprising at least two support rods, each of the at least two support rods being snap-engaged with one of the at least two first slots and one of the at least two second slots, a surface of the support rod assembly facing away from the bottom plate being a bearing surface; and
    two first mounting members connected with the first side plate and the second side plate respectively, each of the two first mounting members comprising a first mounting plate, a third mounting plate opposite to the first mounting plate, a second mounting plate connected to the first mounting plate and the third mounting plate and configured for mounting a steering wheel assembly, and a step portion disposed on an end of the third mounting plate facing away from the second mounting plate.

2. The car body structure of claim 1, further comprising a mounting portion, wherein the mounting portion is disposed on the bearing surface.

3. The car body structure of claim 1, wherein the support rod assembly further comprises at least three support rods, which are arranged at equal intervals.

4. The car body structure of claim 1, wherein each of the at least two support rods comprises a first side wall, a second side wall opposite to the first side wall, and a bottom wall connected between the first side wall and the second side wall; the first side wall, the bottom wall, and the second side wall enclose a groove facing toward the bottom wall, a surface of the bottom wall facing away from the bottom wall is the bearing surface.

5. The car body structure of claim 1, wherein the car body structure comprises sheet metal parts.

6. A driving unit comprising:
a car body structure comprising:
  a bottom plate,
  a side plate assembly comprising a first side plate and a second side plate opposite to the first side plate, the first side plate and the second plate connected to the bottom plate and located on a same side of the bottom plate, an edge of the first side plate facing away from the bottom plate defining at least two first slots, an edge of the second side plate facing away from the bottom plate defining at least two second slots,
  a support rod assembly comprising at least two support rods, each of the at least two support rods being snap-engaged with one of the at least two first slots and one of the at least two second slots, a surface of the support rod assembly facing away from the bottom plate being a bearing surface, and
  a first mounting member, the first mounting member comprising a first mounting plate, a third mounting plate opposite to the first mounting plate, a second mounting plate connected to the first mounting plate and the third mounting plate, and a step portion disposed on an end of the third mounting plate facing away from the second mounting plate; and
a first steering wheel assembly mounted on the car body structure, wherein the first steering wheel assembly is connected to the second mounting plate and is on a side of the second mounting plate facing away from the first mounting plate.

7. The driving unit of claim 6, further comprising a swing arm assembly, wherein the swing arm assembly comprises an arm body, a directional wheel assembly, a second steering wheel assembly, and a rotating shaft assembly, the directional wheel assembly is connected to the arm body and comprises a directional wheel and a driving member, the driving member is connected to the directional wheel and is configured to drive the directional wheel to rotate, the second steering wheel assembly is connected to the arm body, the rotating shaft assembly is disposed between the directional wheel assembly and the second steering wheel assembly and is connected to the arm body and the car body structure, the directional wheel assembly and the second steering wheel assembly rotate in a same direction around the rotating shaft assembly.

8. The driving unit of claim 7, wherein the car body structure further comprises a second mounting member, the second mounting member is connected to at least one of the first side plate and the second side plate, the second mounting member comprises a connecting plate, the connecting plate defines a mounting hole for clamping the rotating shaft assembly, a wall of the connecting plate defining the mounting hole extends outwards to form a notch.

9. The driving unit of claim 7, wherein the car body structure further comprises a third mounting member for installing the driving member, the third mounting member comprises a first recess located on the bottom plate and a second recess located on first side plate or the second side plate, an opening of the first recess is in communication with an opening of the second recess.

10. The driving unit of claim 6, wherein the car body structure further comprises a mounting portion disposed on the bearing surface.

11. The driving unit of claim 6, wherein the support rod assembly comprises at least three support rods, which are arranged at equal intervals.

12. The driving unit of claim 6, wherein each of the at least two support rods comprises a first side wall, a second side wall opposite to the first side wall, and a bottom wall connected between the first side wall and the second side wall; the first side wall, the bottom wall, and the second side wall enclose a groove facing toward the bottom wall, a surface of the bottom wall facing away from the bottom wall is the bearing surface.

13. The driving unit of claim 6, wherein the car body structure comprises sheet metal parts.

* * * * *